United States Patent
Gheorghiu (12)

(10) Patent No.: US 6,287,509 B1
(45) Date of Patent: *Sep. 11, 2001

(54) METHOD FOR FIRING CERAMIC HONEYCOMB BODIES

(75) Inventor: Tudor C. Gheorghiu, Painted Post, NY (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,862

(22) Filed: Nov. 24, 1998

Related U.S. Application Data

(60) Provisional application No. 60/067,158, filed on Dec. 2, 1997.

(51) Int. Cl.[7] ................................................. C04B 33/32
(52) U.S. Cl. ........................ 264/630; 264/631; 264/656
(58) Field of Search .................................. 264/630, 631, 264/657, 656, 669, 670, 674

(56) References Cited

U.S. PATENT DOCUMENTS

| | | | |
|---|---|---|---|
| 4,051,231 | 9/1977 | Bond et al. | 423/659 |
| 4,404,166 | 9/1983 | Wiech, Jr. | 419/36 |
| 4,474,731 | 10/1984 | Brownlow et al. | 419/5 |
| 4,795,598 | 1/1989 | Billiet | 264/40 |
| 4,927,577 | 5/1990 | Ohtaka et al. | 264/63 |
| 4,994,436 | 2/1991 | Giacobbe | 264/65 |
| 5,183,609 | 2/1993 | Miyahara | 264/44 |
| 5,248,255 | 9/1993 | Morioka et al. | 432/127 |
| 5,419,857 | 5/1995 | Van den Sype | 264/40.1 |

FOREIGN PATENT DOCUMENTS 0 709 638    5/1996  (EP) .

OTHER PUBLICATIONS

"Retrofitting Tunnel Kilns", The American Ceramic Society Bulletin, J.J. Lukacs, pp. 48–52. Feb. 1997.
"Pulse/Proportional Jet Firing at Work", Ceramic Industry, Carboy et al. No date provided.
"Jet Firing with Pulse/Proportional Control", American Ceramic Society Bulletin, vol. 73, No. 3, Mar. 1994, pp. 93–96.

*Primary Examiner*—Christopher A. Fiorilla
(74) *Attorney, Agent, or Firm*—Timothy M. Schaeberle; Anca C. Gheorghiu

(57) ABSTRACT

A method of firing a green cordierite-ceramic honeycomb structural body containing a carbonaceous material, for example, an organic binder, including a two phase process. The first phase includes firing the green honeycomb structural body to a temperature and for a time sufficient to initiate and sufficiently achieve release of the carbonaceous material while introducing into the furnace a $CO_2$-enriched atmosphere. Once the carbonaceous material is sufficiently removed, the second phase involves further conventionally firing for a time and a temperature sufficient to initiate and sufficiently achieve the conversion of the green ceramic honeycomb structural body into a fired honeycomb body.

21 Claims, 4 Drawing Sheets

METHOD FOR FIRING CERAMIC HONEYCOMB BODIES

This application claims the benefit of U.S. Provisional Application No. 60/067,158, filed Dec. 2, 1997, entitled METHOD FOR FIRING CERAMIC HONEYCOMB BODIES, by Tudor C. Gheorghiu.

The present invention relates to a method of forming and firing cellular ceramic bodies, more particularly, it relates to a method of firing the cellular ceramic bodies exhibiting problematic high-organic containing batches.

BACKGROUND OF THE INVENTION

Ceramic products of a honeycomb shape, or ceramic honeycomb structures, i.e., cellular ceramic bodies, have been made by preparing a ceramic green body through mixing of ceramic materials with water and various carbonaceous materials, including extrusion and forming aids to form a plasticized batch, forming the body into a honeycomb-shaped ceramic green body through extrusion of the plasticized batch, and finally firing the honeycomb-shaped ceramic green body in a firing furnace at a predetermined temperature.

Extrusion and forming aids used in the above firing of the honeycomb structure include, specifically, organic binders and plasticizers and lubricants, such as methylcellulose, carboxymethlcellulose, polyvinyl alcohol, alkali stearates and the like. Furthermore, other carbonaceous materials such as graphite have been included in the batch as a pore-forming agent.

It is known that the carbonaceous material release or the decomposition of the carbonaceous material, is an oxidation or exothermic reaction which releases large amounts of heat. Initially the exothermic reaction occurs at the skin or outer portion of the part, resulting in an initial thermal differential whereby the outer portion of the ceramic body is hotter than the core. Subsequently, the skin or outer portion exothermic reaction dies down, and the exothermic reaction region moves into the interior of the ware. Because typical substrates are comprised of ceramic materials, for example cordierite, which are good insulators, and exhibit a cellular structure comprising numerous channels, difficulties are encountered in effectively removing, either by conduction or convection, the heat from the ceramic body. Additionally, due to the cellular structure there is considerable surface area to promote binder reaction with the $O_2$ in the firing atmosphere, thus exacerbating this interior exothermic effect. As such, during the carbonaceous material release, the ceramic body exhibits either a positive or negative thermal differential; i.e., the core of the ceramic body exhibiting either a higher or lower temperature than that of the ceramic at/near the surface. This exothermic reaction, which occurs in the 100 to 600° C. temperature range for carbonaceous materials such as an organic binder or the like, or in the 500–1000° C. temperature range if the body contains, for example, graphite, causes a significant temperature differential between the inside and outside of the part. This temperature differential in the part creates stresses in the ceramic body which may result in cracking of the part. This phenomenon is particularly true for large cellular ceramic parts or parts containing large amounts of organic materials.

Techniques for controlling and inhibiting the thermal differential and resultant crack development are well known. One technique involves reducing burner flame temperature by using excess air for burner combustion, resulting in a reduced flame to product temperature gradient and corresponding slower ware heating rates. However, the high excess air yields an undesirably high percentage oxygen-containing atmosphere that reacts with the organics thereby accelerating release and increasing the internal exothermic reaction. As such, minimization of the thermal differential which develops during organic release, must be accomplished through very slow firing schedules or, alternatively, firing schedules which are carefully matched to the particular ware in the kiln.

Use of atmosphere control in periodic-type kilns to affect carbonaceous material release is generally known. See, for example, U.S. Pat. No. 4,404,166 (Wiech, Jr.), U.S. Pat. No. 4,474, 731 (Brownlow et al.), U.S. Pat. No. 4,661,315 (Wiech Jr. et al.) and U.S. Pat. No. 4,927,577 (Ohtaka et al.). Although these methods have been shown to be effective enough for use in periodic-type kilns, they are not generally considered to effective in tunnel kilns due to the considerable influx of ambient air (20.9% oxygen) into the firing atmosphere.

The use of pulse firing technology as a substitute for proportional firing has also been disclosed as a method for controlling and inhibiting thermal gradients in periodic kilns. Pulse firing involves the use of either high fire or low fire burner output conditions only, and produces low heating rates without the use of considerable amounts of excess air (oxygen); see, for example Eur. Pat. Appl. No. 0 709 638 which discloses a method of firing ceramic formed bodies using a furnace having burners which alternate from a high to a low output firing state. Although the use of this firing technology has been somewhat effective in periodic kilns, resulting in a reduction in the incidences of cracking, this pulse firing technique poses difficulties when used in tunnel kilns. Due to the open nature of tunnel kilns it is necessary to control the ambient air ingress into the organic release zones of the kiln by other means.

Therefore, an object of the invention is to solve the above-mentioned problems of the prior art by providing an improved method for use in both tunnel and periodic kilns for firing ceramic honeycomb structural bodies which ensures stable production of high-quality crack-free product.

SUMMARY OF THE INVENTION

It is an object of the present invention to eliminate the above-mentioned problems, and to provide a process for firing ceramic honeycomb structural bodies, which permits the production of ceramic honeycomb structural bodies exhibiting less cracks, in a short time by uniformly firing the inner and outer portions of the green honeycomb structural bodies.

The method of firing a green ceramic honeycomb structural body containing an carbonaceous material is characterized by a two-phase firing process. The first phase comprises firing the green honeycomb structural body in a firing atmosphere to a temperature and for a time sufficient to initiate and sufficiently achieve release of the carbonaceous material while introducing into the firing atmosphere a $CO_2$-enriched gas. Once the carbonaceous material is sufficiently released, the second phase involves further conventionally firing for a time and a temperature sufficient to initiate and sufficiently achieve the conversion of the green ceramic honeycomb structural body into a fired honeycomb body.

Preferably, the $CO_2$ is introduced at a rate such that the $CO_2$ present in the firing atmosphere comprises at least 10% while the $O_2$ present in the atmosphere is less than about 10%.

In the above process, since the $CO_2$ introduced, replaces the $O_2$ in the firing process resulting in a reduction of the thermal gradient between the ceramic green body skin and core, and thereby fired cordierite-ceramic bodies exhibiting far less thermal deformation and cracking are produced.

BRIEF DESCRIPTION OF THE FIGURES

For a better understanding of the invention, reference is made to the attached drawings, wherein.

DETAILED DESCRIPTION OF THE INVENTION

Figure 1:
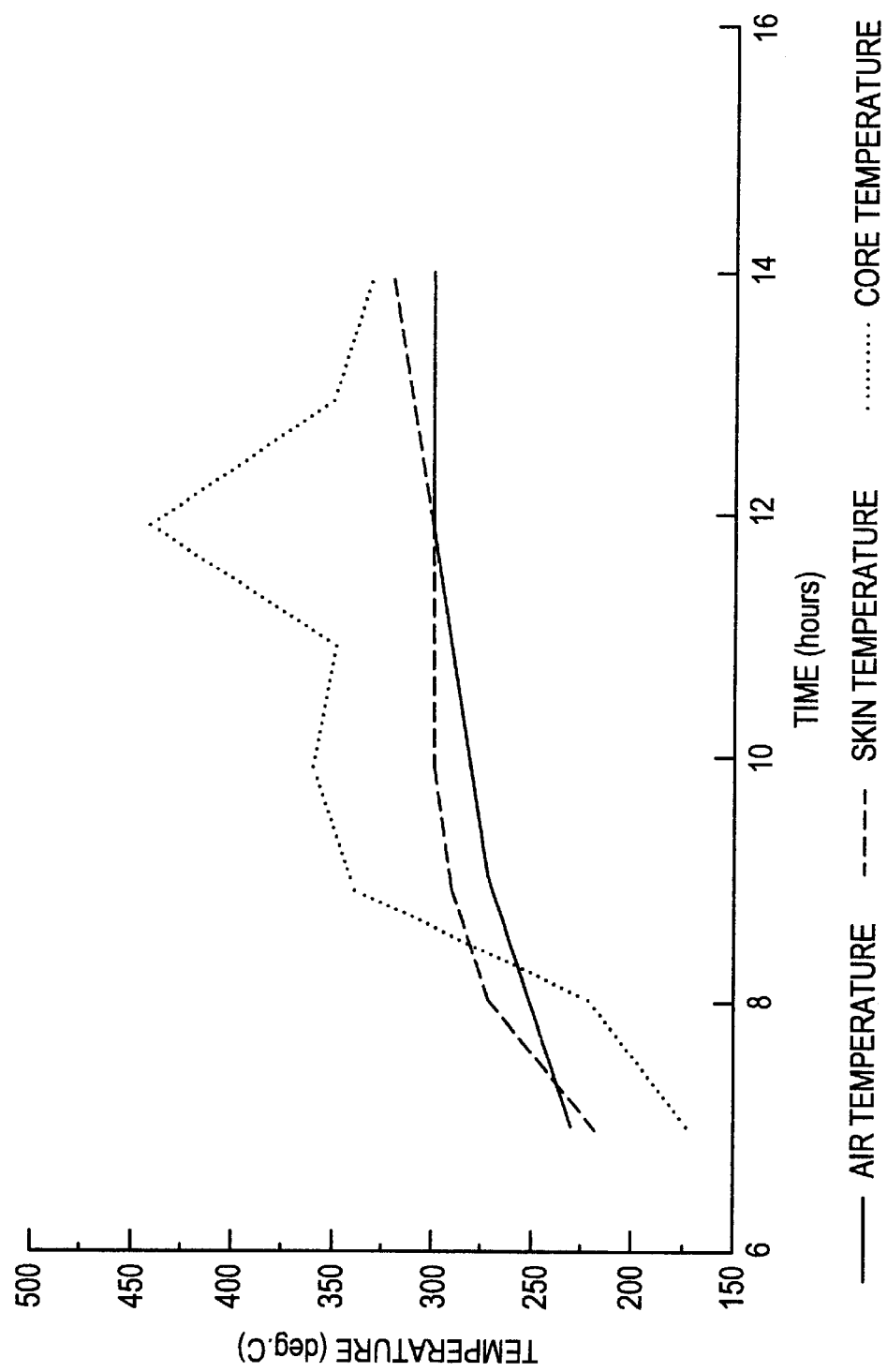
FIG. 1 is diagram representative of the differences in temperature between the core and skin of a ceramic honeycomb structural body formed and fired by the conventional method.

This invention provides an effective method of producing sintered honeycomb ceramic structural bodies, substantially free of any detrimental effects as a result of the release of the carbonaceous material comprising firing the ceramic, prior to sintering, to a temperature and for a time sufficient to substantially achieve the release of the carbonaceous material in an atmosphere which is low in oxygen due to the introduction of a $CO_2$-enriched gas.

This invention may be applied to any ceramic material which may be detrimentally affected by carbonaceous material release and should not be subjected to high oxygen content atmospheres during the release of the carbonaceous additives. Typical ceramic materials include, for example, and without limitation, cordierite and alumina containing ceramics.

The invention is hereinafter described in terms of a cordierite-containing ceramic material, however as aforementioned, this should not considered as limiting the invention to that ceramic material.

Raw materials for ceramic batches useful in the production of cordierite ceramic honeycomb structural bodies, fabricated in accordance with the invention, may be selected from any suitable source. High-purity clay, talc, silica, alumina, aluminum hydroxides and magnesia (MgO)-yielding raw materials are conventionally used for such ceramics and are satisfactory here.

The preferred batch materials in commercial use for the production of very low expansion extruded cordierite ceramic bodies are clay, talc, and alumina, with the clays typically constituting kaolinitic clays of a platey rather than stacked habit. Platey kaolins can be produced by the preprocessing of stacked kaolinite clays, or the raw material batch including the clay can be processed in a way which breaks down the crystal stacks into platelets.

The forming of the dry batch into a preform or green body suitable for conversion to cordierite by firing can be accomplished by any one of a number of known techniques. Depending on the porosity desired in the cordierite product, the batch may be mixed with suitable binders and simply pressed into the shape of a preform, or it may be formed by a hot pressing method.

For the commercial manufacture of flat or thin-walled cordierite ceramic products such as ceramic honeycombs, the preferred forming technique is extrusion. A batch mixture suitable for extrusion can be prepared from the dry batch by mixing the batch with a suitable liquid vehicle. The vehicle may comprise water and carbonaceous extrusion aids necessary to give the batch plastic formability and sufficient green strength after forming to resist breakage prior to firing. Alternatively, the extrusion aids may be mixed with the ceramic batch materials.

The carbonaceous extrusion aids will normally comprise a liquid or solid hydrocarbon material having a vaporization, oxidation or decomposition temperature of below about 600° C., including for example, organic binders such as methylcellulose, carboxymethlcellulose, polyvinyl alcohol, alkali stearates, wheat powder, starch paste, glycerin and wax. Batches of this type, which generally contain 20–35% water, are sufficiently plastic so that they can readily be formed by extrusion into preforms comprising very thin wall dimensions; i.e., less than 1 mm. The plasticized batches can also be formed conveniently by rolling or pressing, the rolled or pressed components then being either used directly or assembled into more complex shapes prior to firing.

Furthermore, the batch mixture can include other carbonaceous materials suitable for use as pore-forming agents, including but not limited to, graphite, cherry pit flower, wood chips, saw dust and starch.

As described above, conventional firing procedures used to convert the plasticized batch or ceramic green body into a cordierite-containing ceramic product typically result in a temperature differential between the outer surface or skin and the inside or core due to the exothermic release. This organic or carbonaceous release occurs between about 100–600° C. for materials such as the organic binders and at temperatures of up to about 1000° C. for the aforementioned graphite-like materials. While the heat generated at the outer periphery or skin is more easily dissipated, though still sufficient to cause stresses which may exceed the strength of the part, the heat generated in the core of the ceramic body is more troublesome as it is not dissipated due to the insulative nature of the cordierite-ceramic body. FIG. 1 illustrates a typical, undesired skin/core temperature profile, of a conventionally fired cordierite-ceramic honeycomb body; this temperature differential is such that the fired body produced tends to exhibit thermally induced deformation as well as firing cracks. As cellular bodies exhibit thinner cell walls and exhibit greater cell densities, and as more and different organic binders and graphite-like materials are used to maintain the structural integrity of these cellular bodies, this phenomenon is likely to increase.

In accordance with the method of the present invention, a desirable cordierite-ceramic crack-free product is obtained in a two phase firing process wherein the green honeycomb structural body is fired, in a firing atmosphere, to a temperature and for a time sufficient to initiate and sufficiently achieve release of the carbonaceous material while introducing a $CO_2$-enriched atmosphere into the firing atmosphere of the carbonaceous release region. Carbonaceous material, e.g., binder, release typically occurs, depending on the type of organic binder, between about 100–600° C., while, on the other hand graphite is typically removed between about 500–1000° C. As such, this carbonaceous material release phase typically requires heating to a first temperature either above the first range or above the second range, depending on whether or not the ceramic body contains an amount of graphite. Preferably, the $CO_2$-enriched atmosphere is introduced into the kiln such that the firing atmosphere contains at least about 10% $CO_2$ and more preferably at least about 14% $CO_2$.

While not intending to be limited by theory, the introduction of the $CO_2$ atmosphere into the firing atmosphere, during carbonaceous material release, is thought to alleviate the cracking of fired cordierite ceramics as a result of the following phenomenon: Essentially the crack alleviation is due to a suppression in the exothermic reaction typically present in carbonaceous material release. This exothermic reaction suppression results in a reduction in the thermal differential which in turn leads to a reduction in thermal stresses which the ceramic parts experience. Regarding the exothermic reaction suppression and subsequent reduction in the thermal differential concept, it is theorized that this effect is due to two mechanisms occurring simultaneously. Firstly, the $O_2$ in the firing atmosphere is displaced thereby reducing the amount of the $O_2$ available to react with the organic present in the body; i.e., a reduction in occurrence in the exothermic reaction $C+O_2 \rightarrow CO_2$+heat. Secondly, the occurrence of a less exothermic reaction; i.e., the reaction between $C+CO_2 \rightarrow CO$ which releases less heat than the $C+O_2 \rightarrow CO_2$ reaction.

Figure 2:
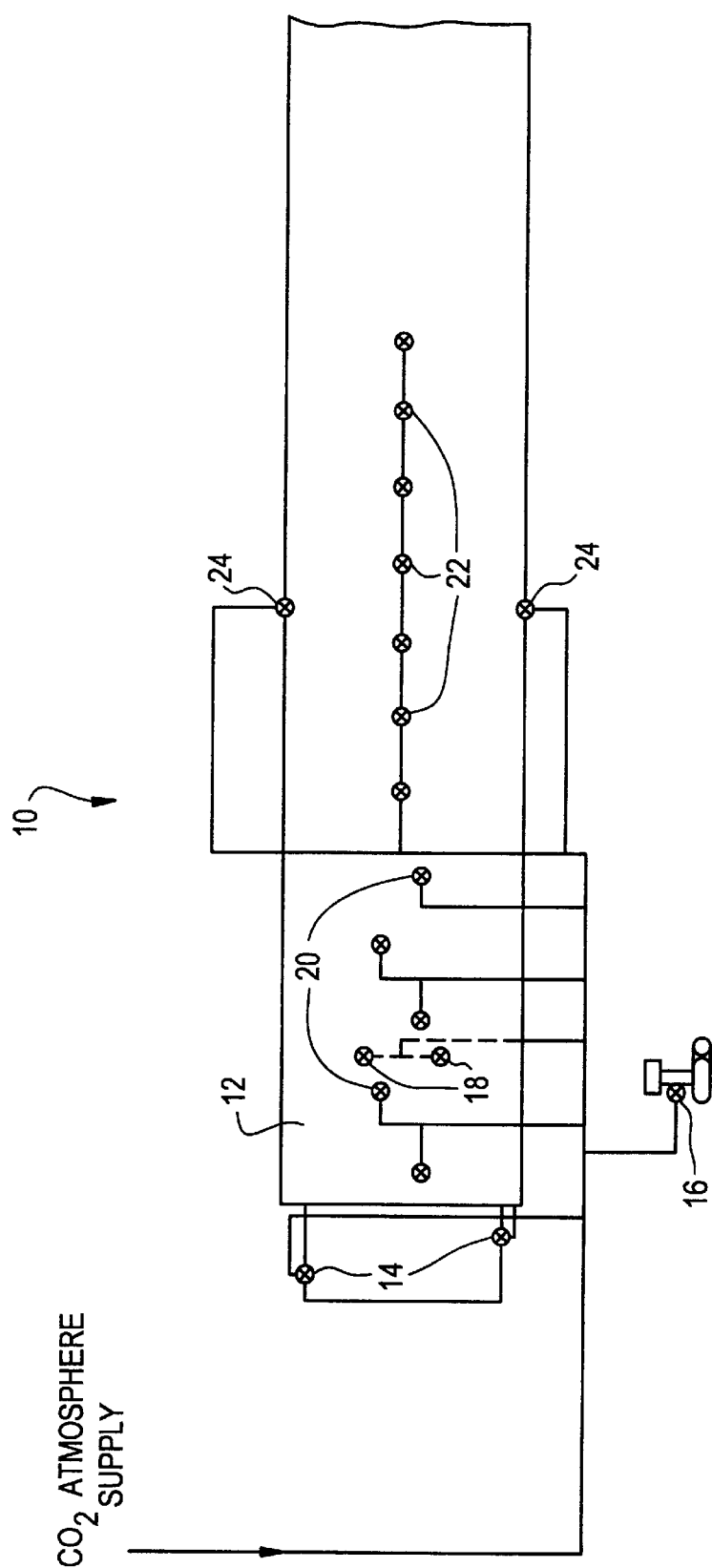
FIG. 2 is a schematic view illustrating an apparatus suitably capable of being used to carry out the process for firing the ceramic honeycomb structural bodies according to the present invention.

FIG. 2 is a top view schematic illustrating an embodiment of a portion of a tunnel kiln for carrying out the firing process according to the present invention. In this embodiment, the tunnel kiln 10 comprises a carbonaceous material release region 12, i.e., the release region, with the sintering region (not shown) located downstream of the release region 12. The release region comprises between about a 100–600° C. temperature range of carbonaceous release. The release region is provided with a piped distribution system comprising a number of injection ports for introducing the aforementioned enriched $CO_2$ gas. The injection ports are positioned in the following locations: in the vestibule 14, in the combustion burner 16, undercar 18, in rooftop near the entrance of the release region 20, in the downstream portion of the release region 22 and in the sidewall of the kiln 24. For a more detailed description of this tunnel kiln and gas distribution system and introduction ports see co-pending and co-assigned patent application, U.S. patent application Ser. No. 60/067,615, hereinafter incorporated by reference. During the carbonaceous release, an externally generated ($CO_2$ Atmosphere Supply) $CO_2$-enriched atmosphere is introduced into the carbonaceous material release region through any one, or a combination, of these $CO_2$ introduction ports, whichever is empirically determined to be the most effective and/or efficient.

After this initial carbonaceous material release phase wherein the carbonaceous material is sufficiently removed, the ceramic green body is further heated for a time and a temperature sufficient to initiate and sufficiently achieve the conversion of the green ceramic honeycomb structural body into a fired honeycomb body whose predominant crystal phase is cordierite. Temperatures in the range of 1340°–1450° C. are generally suitable for this purpose when the ceramic material comprises a cordierite containing ceramic.

The invention may be further understood by reference to the following detailed Examples, which are intended to be merely illustrative of the presently preferred method for carrying out the invention.

EXAMPLE

A ceramic batch suitable for the production of a cordierite-containing ceramic was prepared. The batch comprised conventional clay-talc-alumina batch containing constituents (inorganics) and exhibited an amount of carbonaceous materials, binders, plasticizers and lubricants which generally proved to be problematic in standard tunnel kiln firing procedure; i.e., likely to result in the production of ware exhibiting an unacceptable percentage of cracking. Specifically the batch comprised 92.8% inorganics and 7.2% organics. The batch was thoroughly blended to form a homogeneous batch.

An extrusion batch for the Example was separately prepared from the dried batch material by adding water to the dry batch in a "LÖDIGE" plow-shearing mixer (Stamford, Conn.). Water was added to a level of about 31% of total batch weight, and mixing was continued for a sufficient amount of time to achieve batch uniformity. The mixed batch was extruded at a sufficient amount of pressure to form a honeycomb substrate having a 5.66" diameter, a 6.0" length and having 400 cells/sq.in.

The green ceramic honeycomb substrate example was next dried and then placed into a periodic gas fired kiln. Thermocouples were placed in proximity to the green ceramic honeycomb green substrate's skin and within the core. $CO_2$, having a purity greater than 99%, was injected into the kiln through four openings placed across the kiln burners.

Figure 3:
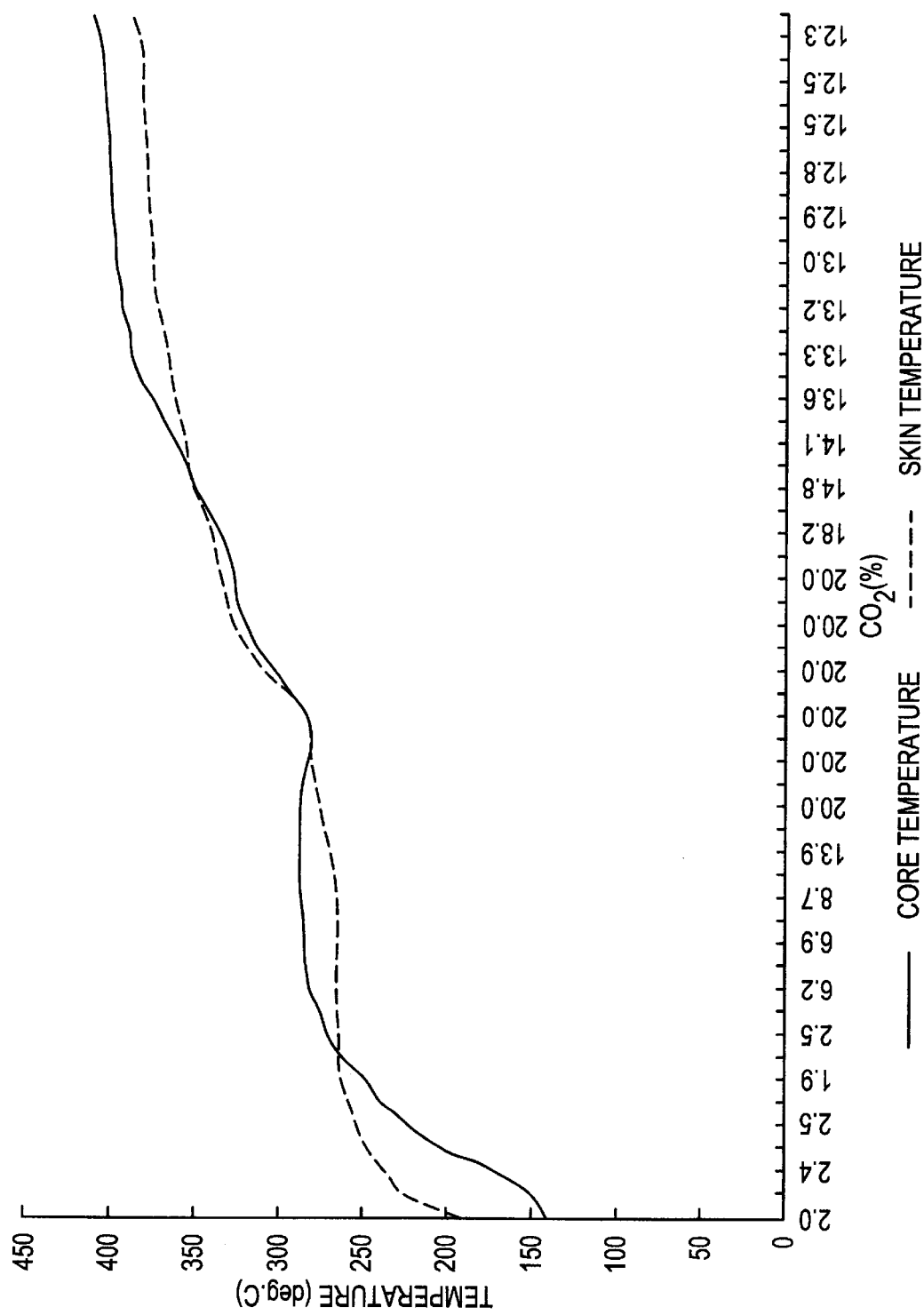
FIGS. 3 and 4 are graphs showing the $CO_2$ and $O_2$ atmosphere concentration and temperature variations between the core and skin of a ceramic honeycomb structural body formed and fired according to the present invention.
Figure 4:
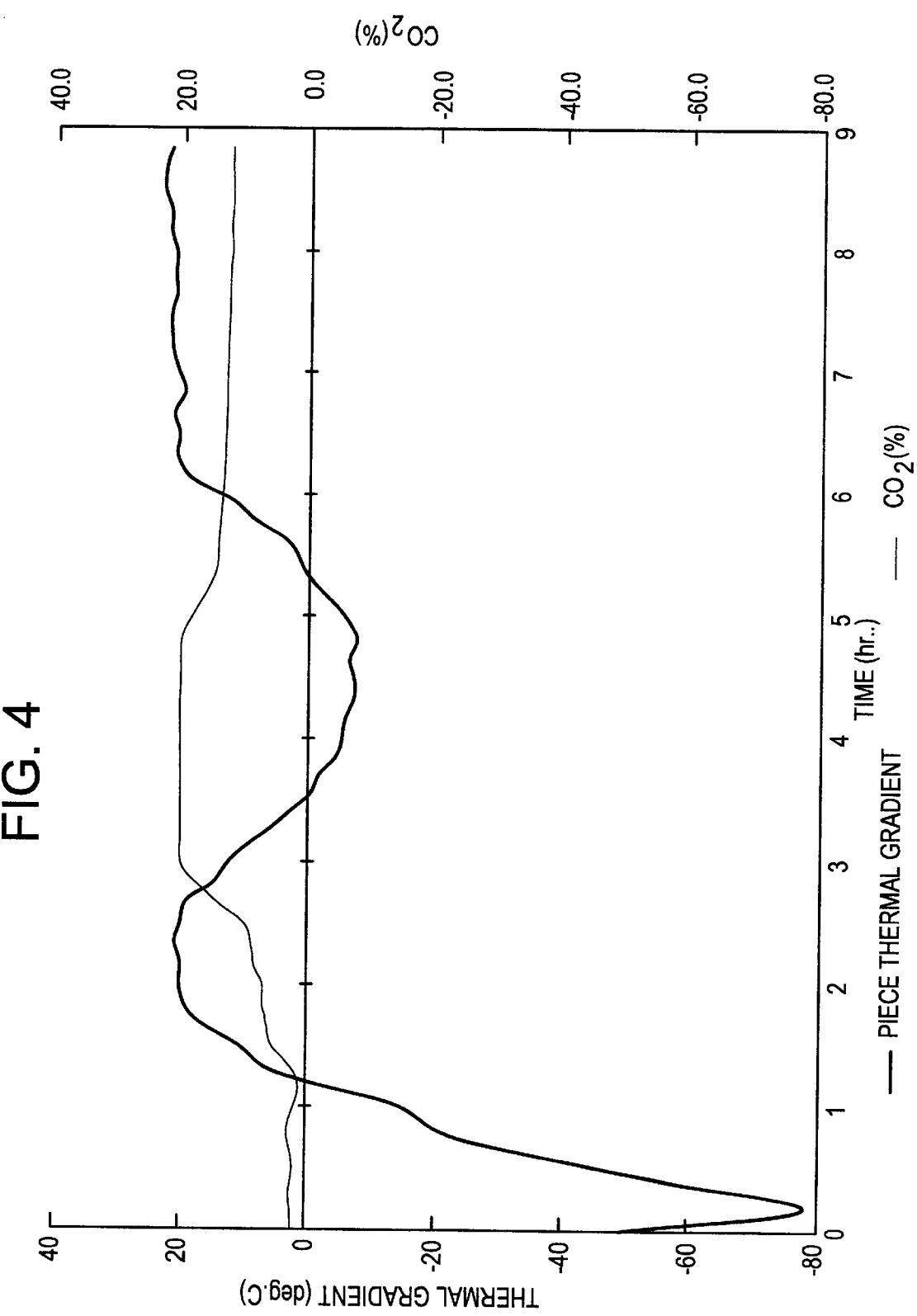

Table I details the firing schedule and the kiln atmosphere, as well as the resulting temperatures of both the core and skin of the green ceramic substrate; the data generated for this ceramic example and kiln configuration is representative of the core/skin temperature profiles and atmosphere conditions which would result using the inventive firing process. An examination of Table I, the results of which are illustrated in FIGS. 3 and 4, reveals that initially the cordierite green body was heated from room temperature to approximately 265° C. in 1.33 hours while the $CO_2$ concentration of the firing atmosphere was maintained at about 2% (range of 1.1 to 2.8%) and the $O_2$ concentration ranged from between about 14 to 16%. The thermal differential of the green ceramic substrate example was reduced from −77° C. (skin temperature higher) to +6° C. (core temperature higher), which was believed to be indicative of the start of the exothermic carbonaceous material release reaction. The ceramic substrate was next maintained at a temperature between 265 and 283° C. for a period of approximately 2.33 hours while the $CO_2$ concentration was increased gradually from 2.5% to 20%. which, in turn resulted in an $O_2$ concentration ranging between 9.5% and 13.1%. During this temperature hold period it is noted that the thermal differential of the cordierite ceramic body initially increased from +6° C. to a maximum of +21° C. and then decreased to −1° C. Specifically, Table I reveals that the temperature of the core stabilized in spite of the continued carbonaceous material release, which was believed to indicate that the $CO_2$ had a suppressing effect on the carbonaceous material release exothermic reaction. It is noted, for this ceramic body and under these kiln conditions, it appears that a firing atmosphere consisting of approximately 14% $CO_2$ was necessary to initiate this exothermic reaction suppressing effect. The temperature of the ceramic body was then increased to 336° C. during the time interval from hour 3.67 to hour 4.83 during which time the $CO_2$ concentration in the firing atmosphere was maintained at or over 20%. Again, it is noted that the thermal differential of the ceramic body was maintained between about −1° C. to −7° C. indicating that the exothermic reaction was still suppressed and considerably slowed. From hour 4.83 to hour 8.83 during which time the temperature of the substrate example was increased to approximately over 400° C., the concentration of $CO_2$ in the firing atmosphere was reduced to approximately 12% resulting in the thermal differential increasing from −7° C. to +23° C. It is noted that there is a marked increase in the thermal differential, indicating that the exothermic reaction due to carbonaceous material release restarted, once the $CO_2$ concentration in the firing atmosphere was reduced to below 14%.

TABLE I

| TIME (HR.) | $CO_2$ (%) | core temperature | skin temperature | piece thermal gradient | CO (%) | $O_2$ (%) |
|---|---|---|---|---|---|---|
| 0.00 | 2.0 | 142 | 193 | −51 | 0.0 | 15.6 |
| 0.17 | 2.3 | 150 | 227 | −77 | 0.0 | 15.3 |
| 0.33 | 2.4 | 171 | 235 | −64 | 0.0 | 14.9 |
| 0.50 | 2.0 | 204 | 249 | −45 | 0.0 | 15.8 |
| 0.67 | 2.5 | 224 | 254 | −30 | 0.0 | 14.8 |
| 0.83 | 2.8 | 239 | 259 | −20 | 0.3 | 14.8 |
| 1.00 | 1.9 | 248 | 263 | −15 | 0.1 | 16.0 |
| 1.17 | 1.1 | 261 | 264 | −3 | 0.1 | 16.1 |
| 1.33 | 2.5 | 271 | 265 | 6 | 0.2 | 13.1 |
| 1.50 | 5.4 | 275 | 265 | 10 | 0.5 | 13.0 |
| 1.67 | 6.2 | 281 | 265 | 16 | 0.7 | 11.9 |
| 1.83 | 6.8 | 284 | 265 | 19 | 0.7 | 12.1 |
| 2.00 | 6.9 | 285 | 265 | 20 | 0.7 | 11.1 |
| 2.17 | 8.3 | 285 | 265 | 20 | 0.9 | 10.1 |
| 2.33 | 8.7 | 286 | 265 | 21 | 1.3 | 9.5 |
| 2.50 | 9.9 | 287 | 267 | 20 | 1.4 | 9.8 |
| 2.67 | 13.9 | 287 | 268 | 19 | 1.4 | 10.0 |
| 2.83 | 17.8 | 287 | 272 | 15 | 1.4 | 10.5 |
| 3.00 | 20.0 | 286 | 273 | 13 | 2.0 | 10.6 |
| 3.17 | 20.0 | 285 | 276 | 9 | 2.0 | 10.4 |
| 3.33 | 20.0 | 282 | 278 | 5 | 2.0 | 11.6 |
| 3.50 | 20.0 | 280 | 279 | 1 | 2.1 | 11.8 |
| 3.67 | 20.0 | 282 | 283 | −1 | 2.3 | 11.9 |
| 3.83 | 20.0 | 292 | 296 | −4 | 2.6 | 11.6 |
| 4.00 | 20.0 | 301 | 306 | −5 | 2.6 | 11.8 |
| 4.17 | 20.0 | 312 | 318 | −6 | 2.6 | 11.4 |
| 4.33 | 20.0 | 318 | 325 | −7 | 2.7 | 10.9 |
| 4.50 | 20.0 | 324 | 331 | −7 | 2.6 | 10.5 |
| 4.67 | 20.0 | 326 | 333 | −7 | 2.4 | 10.3 |
| 4.83 | 20.0 | 329 | 336 | −7 | 2.1 | 10.4 |
| 5.00 | 18.2 | 334 | 339 | −5 | 1.8 | 10.3 |
| 5.17 | 16.4 | 341 | 343 | −2 | 1.6 | 10.0 |
| 5.33 | 14.8 | 348 | 348 | 0 | 1.3 | 10.3 |
| 5.50 | 14.3 | 353 | 351 | 2 | 1.2 | 11.3 |
| 5.67 | 14.1 | 360 | 355 | 5 | 1.2 | 10.9 |
| 5.83 | 13.8 | 367 | 357 | 10 | 1.3 | 10.5 |
| 6.00 | 13.6 | 374 | 360 | 14 | 1.4 | 10.3 |
| 6.17 | 13.5 | 382 | 363 | 19 | 1.3 | 10.2 |
| 6.33 | 13.3 | 386 | 365 | 21 | 1.2 | 10.1 |
| 6.50 | 13.3 | 388 | 368 | 20 | 1.3 | 10.1 |
| 6.67 | 13.2 | 391 | 370 | 21 | 1.2 | 10.1 |
| 6.83 | 13.1 | 393 | 373 | 20 | 1.2 | 10.1 |
| 7.00 | 13.0 | 395 | 374 | 21 | 1.2 | 10.0 |
| 7.17 | 12.9 | 396 | 375 | 22 | 1.2 | 10.0 |
| 7.33 | 12.9 | 397 | 375 | 22 | 1.2 | 10.0 |
| 7.50 | 12.8 | 398 | 376 | 22 | 1.2 | 9.9 |
| 7.67 | 12.8 | 398 | 377 | 21 | 1.2 | 10.0 |
| 7.83 | 12.7 | 399 | 378 | 21 | 1.2 | 10.0 |
| 8.00 | 12.5 | 400 | 379 | 21 | 1.2 | 9.8 |
| 8.17 | 12.5 | 401 | 379 | 22 | 1.2 | 9.9 |
| 8.33 | 12.5 | 402 | 380 | 22 | 1.2 | 9.8 |
| 8.50 | 12.4 | 403 | 380 | 23 | 1.2 | 11.1 |
| 8.67 | 12.3 | 405 | 382 | 23 | 1.2 | 11.1 |
| 8.83 | 12.3 | 408 | 386 | 22 | 1.2 | 11.6 |

It should be noted that the $CO_2$ concentration necessary for effectively initiating the exothermic reaction suppressing effect will vary depending upon a number of factors including the composition, size and shape of the ceramic body, the size of the cell wall and number of cells exhibited by the ceramic body, the kiln configuration and the firing schedule utilized. As such, the concentration of the $CO_2$ required in the firing atmosphere necessary to initiate the exothermic reaction suppressing effect should be empirically determined for each ceramic/kiln system.

Referring now specifically to FIG. 3, and comparing its profile to that of FIG. 1 typical of that which produces cracked ceramic bodies, it is clear that the above-detailed firing process for ceramic honeycomb bodies exhibits a temperature differential between the inner portion and the outer portion of the ceramic body which is far more conducive for producing fired ceramic honeycomb structural bodies which are free of thermal deformations and thermally induced cracks.

We claim:

1. A method for fabricating a ceramic honeycomb structure body comprising the steps of:
    formulating a batch mixture comprised of an amount of sinterable raw materials capable of yielding a fired ceramic honeycomb;
    intimately blending the raw materials with an effective amount of carbonaceous material, to form a plastic mixture;
    forming the raw materials into a green honeycomb structural body and thereafter drying the green honeycomb structural body;
    firing the green honeycomb structural body in an initial firing atmosphere containing between about 14–16% volume $O_2$ to a temperature and for a time sufficient to initiate release of the carbonaceous material and thereafter firing the green honeycomb structure in a second $CO_2$-enriched firing atmosphere to a temperature and for a time sufficient to complete release of the carbonaceous material;
    further heating for a time and a temperature sufficient to initiate and sufficiently achieve the conversion of the green ceramic honeycomb structural body into a fired honeycomb body.

2. The method of claim 1 wherein the batch mixture comprises a mixture of kaolin clay, talc, alumina and other cordierite-forming materials, each of the raw materials included in the batch in an effective amount, which in combination with the other raw materials therein, is capable of yielding a fired honeycomb body whose predominant crystal phase is cordierite.

3. The method of claim 2 wherein the carbonaceous material comprises a liquid or solid hydrocarbon carbonaceous material having a vaporization, decomposition or evaporation temperature of below about 600° C.

4. The method of claim 3 wherein the carbonaceous material comprises a polymer binder.

5. The method of claim 3 wherein the carbonaceous material is comprises a hydrocarbon oil or a wax binder.

6. The method of claim 1 wherein the carbonaceous material comprises graphite.

7. The method of claim 1 wherein the second $CO_2$-enriched firing atmosphere comprises less than about 12.5% $O_2$ during a portion of the carbonaceous material release.

8. The method of claim 1 wherein the second $CO_2$-enriched firing atmosphere comprises less than about 10% $O_2$ during a portion of the carbonaceous material release.

9. The method of claim 1 wherein the second $CO_2$-enriched firing atmosphere comprises at least about 14% $CO_2$.

10. The method of claim 9 wherein the second $CO_2$-enriched firing atmosphere comprises at least about 20% $CO_2$.

11. A method of firing a green ceramic honeycomb structural body containing an amount of sinterable raw materials, including an amount of a carbonaceous material, capable of yielding a fired honeycomb body, comprising the steps of:

firing the green honeycomb structural body in an initial firing atmosphere containing between about 14%–16% volume $O_2$ to a temperature and for a time sufficient to initiate release of the carbonaceous material and thereafter firing the green honeycomb structure in a second $CO_2$-enriched firing atmosphere to a temperature and for a time sufficient to complete release of the carbonaceous material;

further heating for a time and a temperature sufficient to initiate and sufficiently achieve the conversion of the green ceramic honeycomb structural body into a fired honeycomb body.

12. The method of claim 11 involving further firing for a time and a temperature sufficient to initiate and sufficiently achieve the conversion of the green ceramic honeycomb structural body into a fired honeycomb body.

13. The method of claim 11 wherein the sinterable raw materials comprise a mixture of kaolin clay, talc, alumina and other cordierite-forming materials, each of the raw materials included in an effective amount, which in combination with the other raw materials therein, is capable of yielding a fired honeycomb body whose predominant crystal phase is cordierite.

14. The method of claim 11 wherein the carbonaceous material comprises a liquid or solid hydrocarbon material having a vaporization, decomposition or evaporation temperature of below about 600° C.

15. The method of claim 14 wherein the carbonaceous material comprises a polymer binder.

16. The method of claim 14 wherein the carbonaceous material is comprises a hydrocarbon oil or a wax binder.

17. The method of claim 11 wherein the carbonaceous material comprises graphite.

18. The method of claim 11 wherein the $CO_2$-enriched firing atmosphere comprises less than about 12.5% $O_2$ during a portion of the carbonaceous material release.

19. The method of claim 11 wherein the $CO_2$-enriched firing atmosphere comprises less than about 10% $O_2$ during a portion of the carbonaceous material release.

20. The method of claim 11 wherein the second $CO_2$-enriched firing atmosphere comprises at least about 14% $CO_2$.

21. The method of claim 20 wherein the second $CO_2$-enriched firing atmosphere comprises at least about 20% $CO_2$.

* * * * *